P. BERNARD.
STOCK WATERER.
APPLICATION FILED APR. 23, 1907.

925,984.

Patented June 22, 1909.
2 SHEETS—SHEET 1.

Witnesses
Howard D. Orr.
John H. Siggers

Inventor,
Philip Bernard,
By E. G. Siggers
Attorney

THE NORRIS PETERS CO., WASHINGTON, D. C.

P. BERNARD.
STOCK WATERER.
APPLICATION FILED APR. 23, 1907.

925,984.

Patented June 22, 1909.
2 SHEETS—SHEET 2.

Philip Bernard, Inventor,

Witnesses

By

Attorney

UNITED STATES PATENT OFFICE.

PHILIP BERNARD, OF JEFFERSON, SOUTH DAKOTA.

STOCK-WATERER.

No. 925,984.  Specification of Letters Patent.  Patented June 22, 1909.

Application filed April 23, 1907. Serial No. 369,784.

*To all whom it may concern:*

Be it known that I, PHILIP BERNARD, a citizen of the United States, residing at Jefferson, in the county of Union and State of South Dakota, have invented a new and useful Stock-Waterer, of which the following is a specification.

The invention relates to improvements in stock waterers.

The object of the present invention is to improve the construction of stock waterers, and to provide a simple, inexpensive and efficient one, designed for affording both hogs and cattle a supply of fresh water, and adapted as the water is consumed, to feed a fresh supply into the troughs, and capable of automatically cutting off the flow of water, when the same reaches a predetermined level in the troughs.

A further object of the invention is to provide simple and economical means for preventing the water from freezing in cold weather. Also the invention has for its object to enable the troughs to be readily cleaned, when desired.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
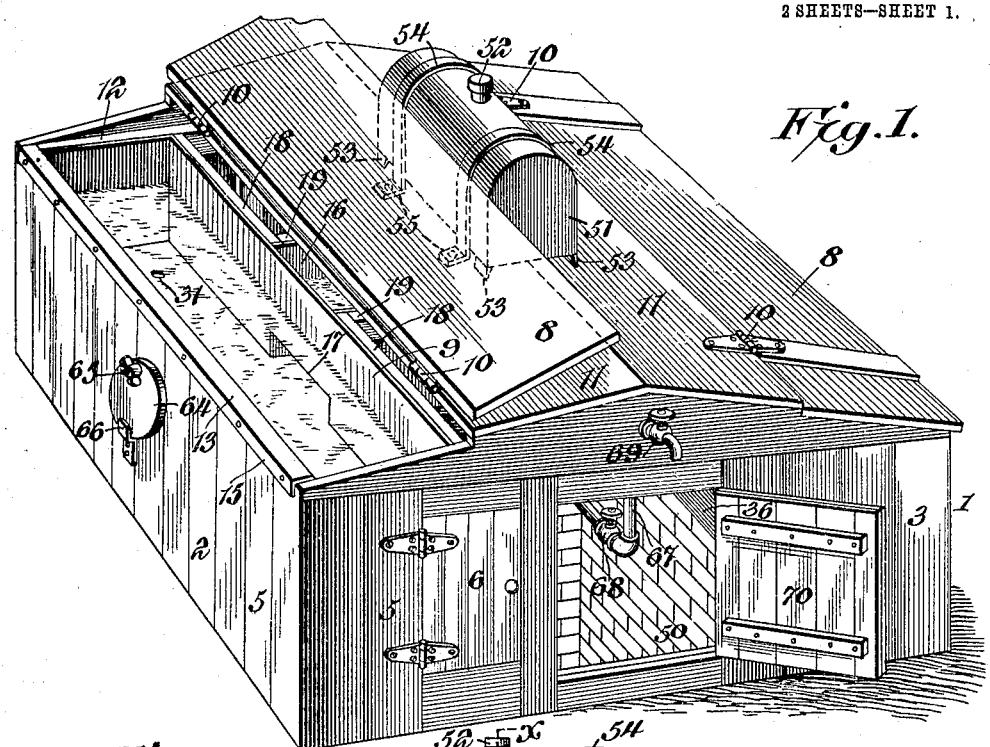
Figure 2:
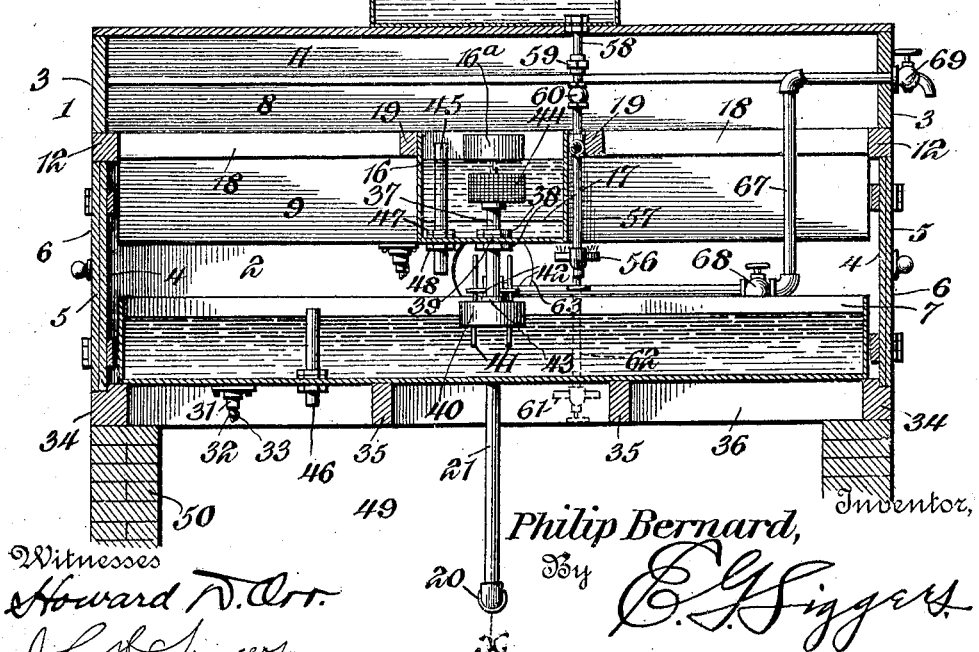
Figure 3:
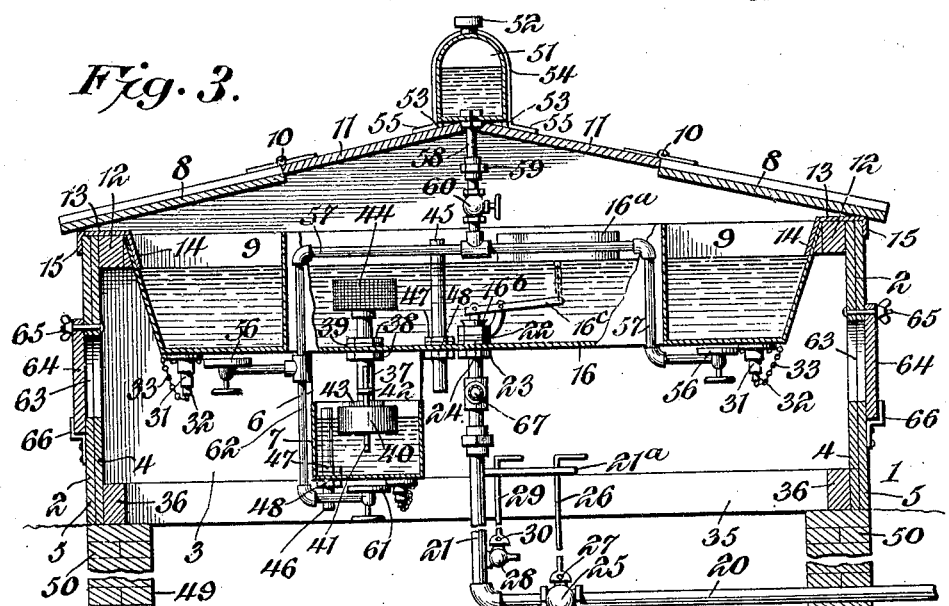
Figure 4:
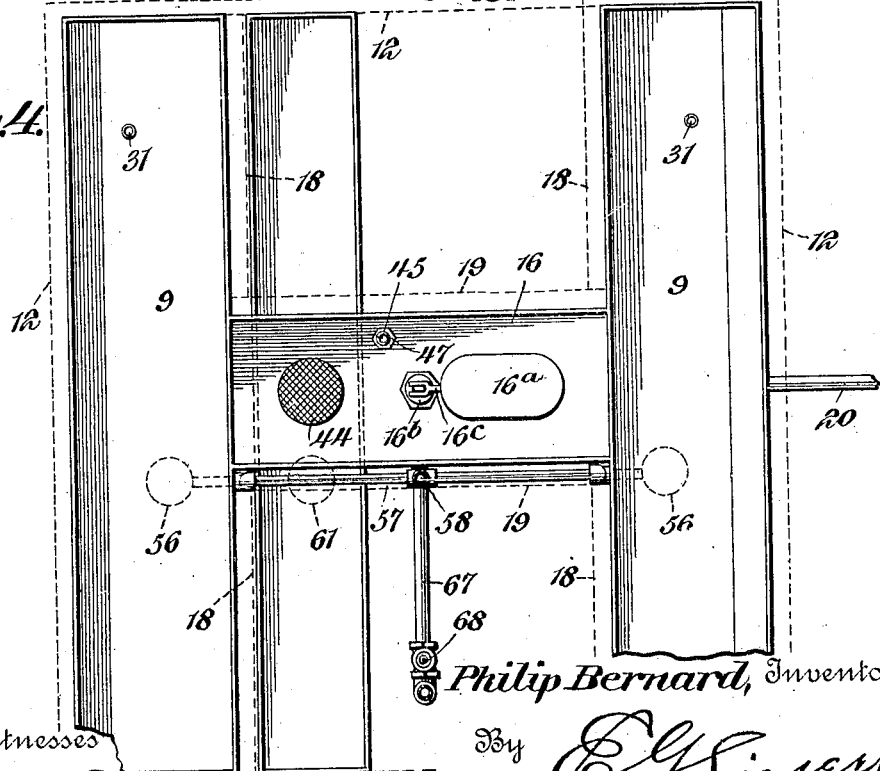

In the drawings:—Figure 1 is a perspective view of a stock waterer, constructed in accordance with this invention. Fig. 2 is a central vertical longitudinal sectional view. Fig. 3 is a transverse sectional view, taken substantially on the line x—x of Fig. 2. Fig. 4 is a plan view, illustrating the arrangement of the trough.

Like numerals of reference designate corresponding parts in all the figures of the drawings.

1 designates a substantially rectangular casing, designed to be constructed of wood and having its side and end walls 2 and 3 composed of inner and outer layers 4 and 5 of sheathing, or other suitable material for retaining the heat within the casing and for excluding the cold, and if desired, suitable non-heat-conducting material may be interposed between the two layers of sheathing. The casing is provided at each end with a door 6 to permit hogs to have access to a lower hog trough 7, and hinged lids or covers 8 are located at opposite sides of the upper portion of the casing to afford access to upper cattle troughs 9. The lids or covers 8, which are arranged at an inclination, are connected at their inner or upper edges by hinges 10 to fixed sections 11 of the top of the casing.

The upper drinking troughs 9, which are arranged in parallelism, are located at opposite sides of the casing, and are suitably secured at their upper edges to timbers 12, which are preferably two by fours, and which are arranged at the side and end walls of the casing at the upper edges thereof. The side walls are also provided at their upper edges with suitable shields 13, constructed of sheet metal, or other suitable material and consisting of horizontal portions and inner and outer flanges 14 and 15. The horizontal portions are arranged on the upper edges of the inner and outer layers of sheathing, and the upper edges of the contiguous timbers; the inner flanges 14 are inclined and extend downwardly into the upper troughs, and the outer flanges 15 are secured by suitable fastening devices to the side walls of the casing. These shields are adapted to prevent water, which may be dropped by the cattle in drinking, from settling in the wood and rotting the same.

The outer side walls of the upper troughs 9 are inclined, and the inner inclined flanges 14 conform to the configuration of the same. The inner walls of the upper troughs are centrally connected with a transverse supply trough 16, and the inner side walls of the trough 9 are provided at the bottom with openings 17 to permit water to flow from the connecting supply trough 16 into the drinking troughs 9. The casing is provided at the inner side walls of the upper drinking troughs 9 and at the side walls of the connecting supply trough 16 with timbers 18 and 19, forming supporting frames of substantially rectangular form.

Water is supplied to the central connecting trough 16 from a main 20, which may be connected with any suitable source of supply and which is provided with an upstanding portion 21, piercing the bottom of the connecting trough 16. The upper end of the upstanding portion 21 is provided with upper and lower nuts 22 and 23, and a suitable gasket or packing 24 is interposed between the bottom of the trough 16 and one of the nuts to provide a water tight joint. The water main is provided adjacent to the lower end of the upstanding or riser portion 21 with a cock or valve 25, to which a key 26 is secured by a pin 27, or other suitable fastening device. The key, which is provided at its upper end with a suitable handle, extends from the main to the casing for enabling the flow of water to the stock waterer to be readily cut off, when desired. The upstanding or riser portion is provided with an air or drain cock 28, to which an operating key 29 is secured by a pin 30, or other suitable fastening device. The air or drain cock 28 enables the water within the riser or upstanding portion 21 of the main to be drained out after the cock or valve 25 is closed. The upper portions of the keys 26 and 29 are supported by a horizontal brace 21ª, mounted on and projecting from the upstanding pipe or riser 21. The drinking troughs 9 are provided with depending nipples 31, forming drain pipes and normally closed by plugs 32. The nipples have attachment flanges, which are secured to the lower faces of the bottoms of the drinking troughs 9, and the plugs 32 are connected by chains 33, or other suitable flexible connections with the troughs to prevent them from becoming lost. The plugs are adapted to be withdrawn to enable the drinking troughs 9 to be readily drained.

The flow of water from the main to the supply trough 16 is controlled by a float 16ª and a float valve 16ᵇ. The float valve 16ᵇ, which may be of any preferred construction, is mounted on the upper end of the riser or upstanding portion 21, and it is provided with a lever 16ᶜ, which is connected with the float 16ª by a chain, or other suitable flexible connection. When the water is consumed by the cattle, the float falls and the float valve opens automatically to permit the water from the main to flow into the drinking troughs, and when the water within the drinking trough rises to the predetermined level, the float will automatically close the valve and cut off the flow of water.

The hog trough 7, which extends from one end of the casing to the other, is supported upon the end bottom sills 34 and by transverse bars 35, which are suitably secured to the side bottom sills 36. Water from the trough 16 flows into the hog trough 7 through a vertically adjustable supply pipe 37, piercing the bottom of the trough 16 and adjustably secured to the same by means of upper and lower nuts 38, a gasket 39 being interposed between the bottom of the trough and one of the nuts to provide a water tight joint. The upper and lower nuts 38, which engage a threaded portion of the supply pipe 37, enable the said pipe to be raised or lowered for controlling the level of water within the hog trough. The flow of water from the trough 16 to the hog trough is automatically controlled by a float 40, arranged to close the lower end of the adjustable supply pipe 37 and provided with rods or stems 41, extending above and below the float 40, as clearly illustrated in Fig. 2 of the drawings, and slidable in suitable guides 42, consisting of eyes or projecting flanges, which project from opposite sides of the supply or feed pipe 37. The depending portions of the rods or stems 41 limit the downward movement of the float. The float is preferably provided at its upper face with a yieldable disk or plate 43, arranged to engage the lower end of the supply pipe 37 for positively cutting off the flow of water. The supply pipe is also provided at its upper ends with a suitable strainer 44 for excluding from the supply pipe 37, accumulation, which might choke, or otherwise interfere with the operation of the same.

The connecting trough 16 and the hog trough are provided with suitable over-flow pipes 45 and 46, piercing the bottoms of the troughs 16 and 7 and provided with upper and lower nuts 47 and 48, which engage threaded portions of the over-flow pipe and adjustably secure the same to the bottoms of the troughs.

The casing is mounted over a pit 49, which is dug at least to the depth of the main and below the freezing point of the ground in order to utilize the heat of the ground inwardly for preventing the water within the troughs from freezing, and thereby reducing the consumption of fuel for the heating devices to a minimum. The pit, which is provided with walls 50 of brick, or other suitable material, also receives the over-flow from the troughs.

Mounted upon the casing is a tank 51, designed to receive gasolene, or other liquid fuel, and provided at the top with a screw cap 52, or other suitable means for supplying the fuel to the tank. The tank, which is provided with feet 53, is secured upon the top of the casing by means of metallic straps 54, which extend over the top of the tank and down the sides thereof. The terminals 55 of the metallic straps are bent outwardly and are pierced by suitable fastening devices for securing them to the fixed sections 11 of the top of the casing. By adjusting the tank in the space between the covers or lids, it is adapted to form a support for the said lids when the same are open. Each lid or cover, when open, is supported in an inclined position by the tank, as illustrated in Fig. 1, whereby the lid or cover is more easily opened and closed.

The water within the troughs 9 is maintained at a temperature above freezing by burners 56, which are connected by suitable branch pipes 57 with a main feed pipe 58, extending downward from the bottom of the tank and communicating with the interior of the same. The pipe 58 is provided with a suitable union or coupling 59, and it has a valve 60 for enabling the flow of fuel to be controlled or cut off entirely. The water within the hog trough is heated by a burner 61, which is connected with one of the branch pipes 57 by a suitable pipe connection 62. These burners may be of any desired construction and are employed for preventing the water within the troughs from freezing in cold weather.

The casing is provided at opposite sides with arm holes or apertures 63, adapted to afford ready access to the burners and to the drain plugs. These apertures 63 are normally closed by pivoted covers 64. The covers are connected with the casing above the apertures 63 by bolts 65, having suitable thumb nuts, and suitable keepers 66 are mounted below the openings to receive the lower edges of the covers. The keepers consist of plates or pieces having projecting L-shaped arms or engaging portions.

A discharge pipe 67, which extends from the upstanding or riser portion 21 of the main to the exterior of the casing at one end thereof, is provided with an inner valve or cock 68 and an outer valve 69, which is in the form of a faucet. The stock waterer is equipped with the discharge pipe 67 to enable water to be obtained for various purposes other than for use in the stock waterer. The inner valve is employed in cold weather to more effectually prevent the water from freezing, and the outer valve is used in warm weather, when there is no danger of the water freezing in the discharge pipe 67. When the inner valve is used for controlling the flow of water through the discharge pipe 67, the outer valve or faucet is left open, and when the latter is used, the inner valve is left open. The discharge pipe 67 consists of an inner lower horizontal portion, an intermediate vertical portion and an upper outer horizontal portion, which, when the outer valve is open and the inner valve is closed, is adapted to drain to prevent the outer exposed portion from freezing. The casing is provided at the end having the faucet 69 with a door 70, which affords access to the inner valve and other portions of the apparatus.

Having thus fully described my invention, what I claim as new and desire to secure by Letters Patent, is:—

1. A stock waterer comprising a casing having side and end walls, spaced longitudinal drinking troughs, a narrow transverse feed trough extending across the space between the drinking troughs and communicating with the same at points between the ends thereof, and substantially rectangular supporting frames located in the space between the end portions of the drinking troughs and mounted on the end walls of the casing and fitting against the inner sides of the drinking troughs and secured to the same and to the sides of the feed trough.

2. A stock waterer comprising a casing having side and end walls and provided at the top with spaced lids, opposite longitudinal drinking troughs located beneath the lids, a narrow transverse feed trough extending across the space between the lids and communicating with the drinking troughs at points between the ends thereof, substantially rectangular supporting frames located in the space between the end portions of the drinking troughs and mounted on the end walls of the casing and fitting against the inner sides of the drinking troughs and secured to the same and to the sides of the feed trough, and means for supplying water to the feed trough.

3. In a stock waterer, the combination of an upper feed trough, a lower drinking trough extending beneath the feed trough, a vertical supply pipe depending from the feed trough and extending into the drinking trough, fixed horizontally disposed eyes extending from opposite sides of the supply pipe at points intermediate of the ends thereof, a float located within the lower trough and arranged beneath the supply pipe, a valve mounted upon and carried by the float and arranged to close the lower end of the supply pipe, and opposite vertical stems connected at an intermediate point with the float and extending above and below the same, the upper portions of the stems being arranged in and slidable through the said eyes.

4. In a stock waterer, the combination of an upper feed trough, a lower drinking trough extending beneath the feed trough, a vertically adjustable supply pipe depending from the feed trough and extending into the lower trough, fixed horizontally disposed guides extending from opposite sides of and carried by the supply pipe in the vertical adjustment thereof, a float located within the lower trough and arranged beneath and adapted to close the lower end of the supply pipe, and opposite parallel vertical stems connected at an intermediate point with the float and extending above and below the same, the upper portions of the stems being arranged in and slidable through the said guides.

5. A stock waterer comprising a casing composed of side and end walls and provided at the top with spaced lids hinged at their inner edges, drinking troughs mounted within the casing and located beneath the lids, burners located beneath the drinking troughs, and a fuel tank connected with the burners and mounted on the top of the casing between the lids and forming a support for the same when the said lids are open.

6. A stock waterer comprising a casing composed of side and end walls and provided at the top with spaced lids hinged at their inner edges, drinking troughs mounted within the casing and located beneath the lids, a feed trough extending across the space between the drinking troughs and communicating with the same, means for supplying water to the feed trough, burners located beneath the drinking troughs, and a fuel tank connected with the burners and mounted on the top of the casing between the lids and forming a support for the same when the latter are open.

7. A stock waterer comprising a casing having side and end walls and provided at the top with fixed inclined sections and having lids hinged at their inner edges to the fixed inclined sections, drinking troughs mounted within the casing and located beneath the lids, means for supplying water to the drinking troughs, burners located beneath the troughs, and a fuel tank mounted upon the fixed inclined sections of the casing and connected with the burners and forming supports for the lids when the latter are open.

In testimony, that I claim the foregoing as my own, I have hereto affixed my signature in the presence of two witnesses.

PHILIP BERNARD.

Witnesses:
  E. W. BERNARD,
  J. B. FUNTAIN.